INVENTORS
JEAN A. PAUMIER &
PIERRE E. TERRASSON

United States Patent Office 2,907,639
Patented Oct. 6, 1959

2,907,639

APPARATUS FOR DETECTING LEAKAGE OF GASEOUS HALOGEN COMPOUNDS

Jean Alexandre Paumier and Pierre Eugène Terrasson, Fecamp, France

Application April 30, 1957, Serial No. 656,015

5 Claims. (Cl. 23—254)

It is an object of this invention to provide a method for detecting the escape of refrigerator gas, for example methyl chloride, Freon 12, or Freon 114, and other halogen compounds, e.g. chloroform, trichlorethylene, carbon-tetrachloride, and an apparatus for carrying out this method.

In order to ensure the satisfactory progress and the safety of industrial and domestic installations utilising halogeneous compounds it is necessary to limit as far as possible the leakage of these compounds, which requires primarily their detection. It is moreover evident that, to be profitable, the operation of detection of the leakage must be effected by means of a method capable of revealing the least trace of the halogen compound and with an apparatus convenient to handle, dependable and ready to function at any moment during a long period of time.

The method and apparatus forming the object of the present invention fulfill these considerations.

They permit, in particular, instantaneous detection of the escape of refrigerator gas in an amount about equal to a bubble, or one-hundred and fiftieth of a cubic centimetre, escaping every 10 to 15 seconds, a leakage which is generally acceptable since it corresponds to the loss of 50–75 grams of the refrigerator gas in a year.

The present method comprises drawing off the gas to be detected mixed with the surrounding air, decomposing it by catalysis and causing the substances produced by this decomposition to pass over an ammonia containing reagent, so that the existence of a leakage is indicated by visible fumes of a volatile compound produced by the subsequent reaction.

The present invention also provides apparatus for the detection of a gas leakage, comprising a catalytic decomposition chamber enclosing a platinum filament adapted to be heated, said chamber being on the one hand open to the atmosphere and on the other hand communicating with a reaction chamber furnished with an ammonia containing reagent, which chamber communicates in turn with a vision chamber having at least one transparent wall and which is connected to a source of reduced pressure.

Advantageously the apparatus is combined with a casing incorporating an electric bulb and battery and serving as a handle for the assembly, the bulb being arranged to illuminate the vision chamber and current from the battery also being adapted to heat the catalysing filament.

The accompanying drawing shows by way of example one embodiment of an apparatus for carrying out the method of the present invention.

Figures 1, 2:
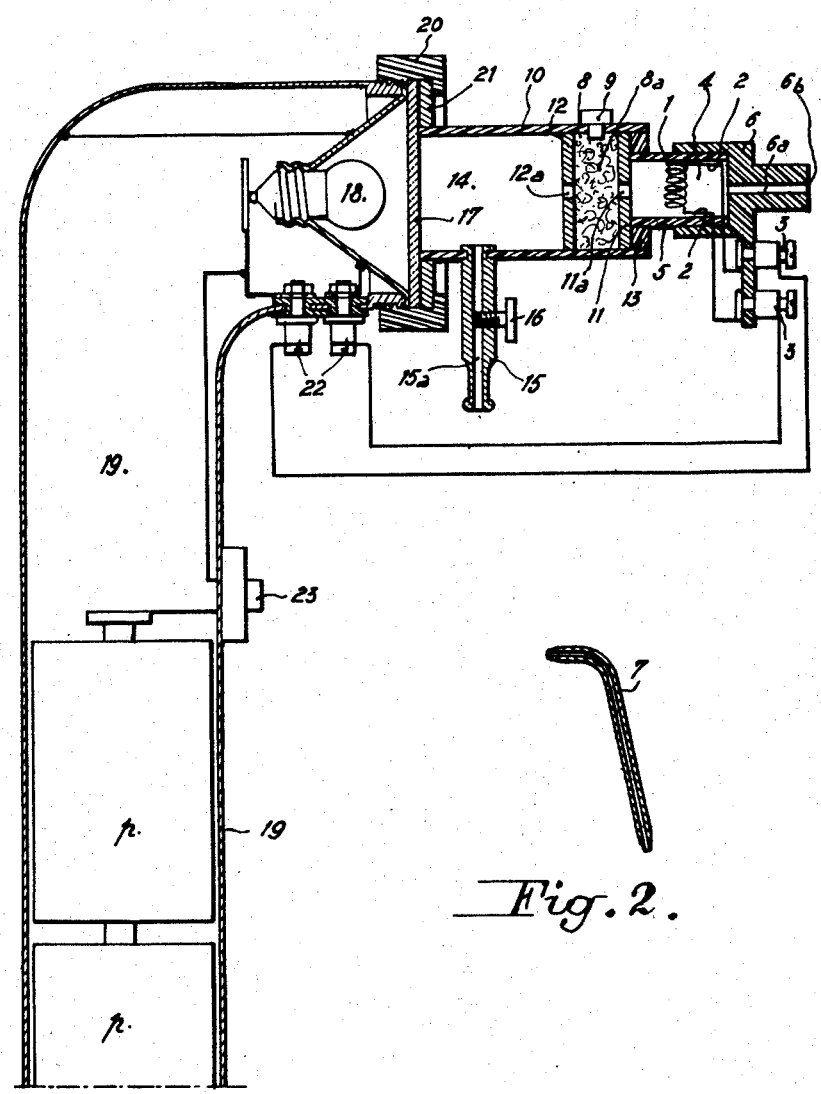
Figure 1 is a schematic sectional view of the assembly.
Figure 2 is a longitudinal section of an extension piece for the assembly.

As shown on the drawing, the apparatus comprises the catalysing filament 1, consisting of a coil of platinum wire having an overall diameter of about 1 mm., whilst the diameter of the constituent filament is about 0.1 mm.

The coil 1 is soldered to two electrodes 2, for example of lead, connected to the two contact terminals 3.

The assembly: spiral 1—electrodes 2, is mounted in a chamber 4, conveniently termed "catalytic decomposition chamber," which comprises the interior of a piece of glass tubing 5, mounted in a support 6 of plastic material which carries the terminals 3 externally of said chamber.

The support 6 is pierced by an axial channel 6a which enables the chamber 4 to communicate with the atmosphere by means of its orifice 6b, which will be presented in the immediate neighbourhood of the point, for example of a refrigerating apparatus, which is to be tested.

In this orifice 6b one end of a bent tubular extension piece 7 (Figure 2) can be fitted, for example either resiliently or by screwing, this extension piece permitting points to be reached for testing which otherwise would be inaccessible.

The chamber 4 also communicates with a chamber 8, termed "the reaction chamber" which is filled with cotton 8a impregnated with an ammonia containing reagent: an ammoniated reagent or a solution of ammonia, which is poured on to it when required through an opening fitted with a stopper 9.

The chamber 8 consists of the interior of a plastic tube 10, such as for example that marketed under the registered trademark "Plexiglas" and it is bounded by two partitions 11 and 12 which are apertured at 11a and 12a respectively. The aperture 11a provides communication between chambers 8 and 4, the casing 5 of the latter being for example screwed in an end wall 13 of the tube 10, up to contact with the partition 11.

The aperture 12a provides communication between the reaction chamber 8 and the vision chamber 14 which latter is likewise formed in the transparent casing 10 and is connected to a source of reduced pressure of any suitable type.

In the embodiment shown in the drawing the casing 10 carries a nipple 15, the bore 15a being regulated by means of screw 16, this nipple 15 being fitted with a rubber bulb (not shown) provided with a valve so that an aspiration of air is caused in the circuit 6b, 6a, 4, 8, 14 each time the bulb resumes its original shape after compression.

On the side opposed to the wall 12 the chamber 14 is closed by the transparent sheet 17 which is advantageously illuminated by a light source, preferably the bulb 18 of an electric torch 19 which serves as the handle for the whole apparatus.

In this embodiment it is assumed that the torch casing is cranked. The window of this torch casing comprises the above-mentioned sheet 17 which is firmly held, on the casing 10, by means of a screw 20 and an intermediate plastic sealing ring 21.

This electric torch is provided with a battery of several cells p and advantageously the current of the latter is utilised not only for lighting the bulb 18, but also for simultaneously heating the catalysing filament 1, due to the connection of the two auxiliary terminals 22 with the terminals 3 of the filament 1, the torch having a single switch 23.

It is of advantage to apply to the walls of the chamber 14 a coating of a silicone so as to avoid the formation of condensation moisture which would interfere with the visibility.

The functioning of the apparatus is as follows:

The orifice 6b, or that of the extension piece 7, is located in the neighbourhood of the suspected leakage and the gas to be detected is drawn off in admixture with the ambient air, each time the rubber bulb resumes its original form following compression, the mixture following the course 6a, 4, 8, 14, 15a and rubber bulb.

On reaching the chamber 4, the gas is catalytically decomposed by the platinum coil 1, heated to dull red by the current of the battery. There is then formed, for example, water vapor, chlorine and hydrochloric acid gas (where the gas to be detected is methylchloride), hydrofluoric acid gas and hydrochloric acid gas (where the gas to be detected is "Freon"). These products pass into the chamber 8 and form with the ammoniated reagent or ammoniacal solution, which impregnates the cotton 8a in this chamber, either a volatile chloride (in the first case) or a volatile ammonium chloride and ammonium fluoride (in the second case).

These compounds pass into the more voluminous chamber 14 where they are expanded and, in consequence, produce white fumes which are withdrawn into the atmosphere by passing through the conduit 15a and the rubber bulb.

From the foregoing description it will be seen that our invention provides a compact portable instrument that can be easily carried about from place to place and used in any location where test for leakage should be made. The operator may hold the casing 19 in one hand with his finger positioned to operate the switch button 23, while using his other hand to squeeze the bulb attached to nipple 15, at the same time steadying the instrument and aiding the point the tube 7 to the desired location. The tube 10 is visible from the top, sides and bottom, while the lamp is so recessed that its light is projected into the chamber 14, where any particles such as will produce diffusion will be seen. After a test has been made, the device may be quickly scavenged with air. Since the test is made intermittently with relatively small volumes of gas, the current consumption is low and the life of the batteries is not quickly spent.

It will be understood that the invention is not limited to the embodiment which has been described and shown, but covers also modifications thereof, within the scope of the appended claims.

We claim:

1. A portable apparatus for detecting the presence of a gaseous halogen compound in air comprising a decomposition chamber having a platinum filament therein and with an air inlet opening therein, a reaction chamber in axial alinement with the inlet chamber and having an axial opening into the reaction chamber, said reaction container having an air permeable mass therein with an ammonia reagent therein, a vision chamber in axial alinement with the reaction chamber and separated therefrom by a partition having an axially extending opening therethrough that establishes communication between said chambers, an outlet nipple on said vision chamber for exhausting gas therefrom, said three axially alined chambers being rigidly connected to each other, a handle member on which the vision chamber is rigidly mounted, said handle member having a battery holding chamber therein to provide current for heating the platinum filament.

2. A portable apparatus for detecting the presence of gaseous halogen compounds in air as defined in claim 1 in which the portable handle carries a light bulb in axial alinement with the vision chamber, a transparent partition between the light bulb and the vision chamber, and circuit means for energizing the light bulb and heater from batteries contained in the handle.

3. A portable apparatus for detecting the presence of gaseous halogen compounds in air as defined in claim 2 in which the battery holding chamber of the handle is perpendicular to the axis of the three chambers, and the exhaust nipple on the vision chamber is radial to said chamber and spaced from the perpendicular portion of the handle sufficient to provide for the fitting of a squeeze bulb to the nipple.

4. A portable apparatus for detecting the presence of gaseous halogen compounds in air as defined in claim 3 in which the circuit means includes a push button type of switch on the perpendicular portion of the handle controlling the flow of current to both the light and the platinum filament.

5. A portable apparatus for detecting the presence of gaseous halogen compounds in air as defined in claim 1 in which the decomposition chamber has an axially extending projection at its free end in which the air inlet opening extends, and an extension tube fitted into said opening.

References Cited in the file of this patent

UNITED STATES PATENTS

| 2,136,741 | Henne | Nov. 15, 1938 |
| 2,774,652 | Vonnegut | Dec. 18, 1956 |